United States Patent
Kawashita et al.

(10) Patent No.: US 8,550,772 B2
(45) Date of Patent: Oct. 8, 2013

(54) SEAL MEMBER, STEAM TURBINE, AND METHOD OF AVOIDING RESONANCE

(75) Inventors: Rimpei Kawashita, Hyogo (JP); Tamiaki Nakazawa, Tokyo (JP); Tsuyoshi Miyabe, Tokyo (JP); Ryokichi Hombo, Tokyo (JP); Takashi Nakano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 524 days.

(21) Appl. No.: 12/922,601

(22) PCT Filed: Mar. 10, 2009

(86) PCT No.: PCT/JP2009/054570
§ 371 (c)(1),
(2), (4) Date: Sep. 14, 2010

(87) PCT Pub. No.: WO2009/119306
PCT Pub. Date: Oct. 1, 2009

(65) Prior Publication Data
US 2011/0014031 A1   Jan. 20, 2011

(30) Foreign Application Priority Data
Mar. 26, 2008  (JP) .................................. 2008-082171

(51) Int. Cl.
*F01D 25/04* (2006.01)

(52) U.S. Cl.
USPC .......................................... 415/108; 415/119

(58) Field of Classification Search
USPC ........... 415/119, 214.1, 213.1, 108; 277/635, 277/636
See application file for complete search history.

(56) References Cited

U.S. PATENT DOCUMENTS

| | | | |
|---|---|---|---|
| 5,511,828 A | 4/1996 | Kurek et al. | |
| 7,300,261 B2 * | 11/2007 | Cafri et al. | 417/363 |

FOREIGN PATENT DOCUMENTS

| | | |
|---|---|---|
| JP | 59232627 | * 12/1984 |
| JP | 7-259552 | 10/1995 |
| JP | 8-100545 | 4/1996 |
| JP | 10-131860 | 5/1998 |
| JP | 10-141565 | 5/1998 |
| JP | 11-351385 | 12/1999 |
| JP | 2001-140975 | 5/2001 |
| JP | 3831617 | 8/2002 |
| JP | 2003-056308 | 2/2003 |

OTHER PUBLICATIONS

International Search Report issued May 26, 2009 in International (PCT) Application No. PCT/JP2009/054570.
Korean Notice of Allowance issued Dec. 28, 2012 in corresponding Korean Patent Application No. 10-2010-7021056 with partial English translation.

* cited by examiner

Primary Examiner — Edward Look
Assistant Examiner — Maxime Adjagbe
(74) Attorney, Agent, or Firm — Wenderoth, Lind & Ponack, L.L.P.

(57) ABSTRACT

A first seal member includes a double-structure bellows in corrugated form, and vibration control device provided on the outside of the bellows such as to cover part of the bellows. A flat portion that is not in corrugated form is provided in part of the bellows. The vibration control device is provided in circumferential direction on an outer surface of the flat portion, and made up of a ring-shaped rib having a plurality of holes in a circumferential direction and weights inserted in the holes provided in a wall of rib. Natural frequency is adjusted by adjusting the number of weights, thereby preventing resonance between the natural frequency of the first seal member and the rotational frequency of rotor from occurring.

5 Claims, 8 Drawing Sheets

SEAL MEMBER, STEAM TURBINE, AND METHOD OF AVOIDING RESONANCE

BACKGROUND OF THE INVENTION

I. Technical Field

The present invention relates to a seal member which is composed of a double-structure bellows and is provided between a casing and a bearing in a nuclear steam turbine that generates power by rotating a rotor using steam. The present invention also relates to a steam turbine and a method of avoiding resonance.

II. Description of the Related Art

In a typical steam turbine, an inner casing is provided inside an outer casing, wherein a steam inlet portion is provided in an upper part. A rotor is rotatably supported in a central part, and the rotor has a plurality of stages of rotor blades fixed thereto. At the same time, a plurality of stages of nozzles are fixed to a turbine diaphragm supported in the inner casing such that they are arranged alternately with the rotor blades fixed on the rotor.

Thus, during operation of the steam turbine, steam that has entered the inner casing from the steam inlet portion flows through the nozzles supported on the turbine diaphragm via a partition wall and hits the rotor blades, thereby rotating the rotor to drive a generator connected to this rotor.

In the steam turbine, the rotor, which is a rotating member, is supported by bearings in a rotatable manner, and the bearings are supported on a foundation made of concrete or the like of the steam turbine. A gland part is supported using a bearing base and its connecting part that are supported on the foundation. A corrugated pipe called bellows, which is movable seal means, is used to seal between the gland part and the casing. The bellows absorbs displacement between the casing and the gland part caused by thermal expansion of the casing, as well as prevents vibration of the combustion engine from being transmitted (see, Japanese Patent Application Laid-Open No. Hei 10-141565 and Japanese Patent No. 3831617).

SUMMARY OF THE INVENTION

For steam turbines in a nuclear power plant, bellows having, for example, a multi-layer structure, are employed to prevent accidents and to enhance safety and reliability.

However, one problem with double-structure bellows is that the natural frequency of the bellows varies largely depending on how tightly the bellows are in close contact with each other, because of which resonance may occur between the natural frequency of the double-structure bellows and the rotational frequency of the rotor.

In view of the above problem, an object of the present invention is to provide a seal member that allows for adjustment of the natural frequency of bellows having a double structure thereby preventing resonance between the natural frequency of the bellows and the rotational frequency of a rotor.

According to an aspect of the present invention, a seal member includes: a multiple-layer bellows including at least two or more overlapping bellows spaced apart a predetermined distance from each other; and a vibration control unit provided on an outside of the bellows such as to cover part or all of the bellows.

Advantageously, in the seal member, a flat portion that is not in corrugated form is provided in part of the bellows, and the vibration control unit is provided in a circumferential direction on an outer surface of the flat portion, and the vibration control unit includes a ring-shaped rib having a plurality of holes in a circumferential direction and a weight inserted in each of the holes provided in an outer wall of the rib.

Advantageously, in the seal member, the bellows is formed in a corrugated shape, and the vibration control unit is a ring-shaped rib provided in a circumferential direction in one or more grooves in outer circumference of the bellows.

Advantageously, in the seal member, the rib is provided with a coating member on a surface on which the rib is in contact with the bellows.

Advantageously, in the seal member, the vibration control unit includes at least one or more anti-vibration members disposed on an outer circumferential side of the bellows and along the same direction as an axial direction of the bellows.

Advantageously, in the seal member, at least two or more of the bellows are coupled in series, and the vibration control unit includes a spacer interposed between the plurality of bellows.

According to another aspect of the present invention, a steam turbine includes: a low pressure turbine including an inner casing disposed inside an outer casing, a turbine rotor disposed inside the inner casing, a plurality of rotor blades fixed to the turbine rotor at a predetermined interval, and a plurality of nozzles fixed inside the inner casing such as to be positioned between respective adjacent rotor blades, both ends of the turbine rotor being rotatably supported by a bearing part of the outer casing; and the seal member described above, provided between the casing and the bearing in the steam turbine.

According to still another aspect of the present invention, a method of avoiding resonance includes using the seal member described above to reinforce rigidity of the bellows in a circumferential direction, thereby adjusting vibration frequency of the bellows.

According to still another aspect of the present invention, a method of avoiding resonance includes using the seal member described above for a bellows provided between a casing and a bearing in a steam turbine.

One embodiment of the seal member of the present invention includes a double-layer bellows consisting of at least two or more overlapping bellows spaced apart a predetermined distance from each other, and vibration control means provided on the outside of the bellows such as to cover part or all of the bellows. Accordingly, it can adjust the natural frequency of the bellows and resonance between the natural frequency of the bellows and the rotational frequency of a rotor can be avoided.

According to the seal member of one embodiment of the present invention a flat portion that is not in corrugated form is provided in part of the bellows, and the vibration control means is provided in a circumferential direction on an outer surface of the flat portion and is composed of a ring-shaped rib having a plurality of holes in a circumferential direction and a weight inserted in the holes provided in an outer wall of the rib. Accordingly, it can adjust the natural frequency of the bellows with the number of the weights attached to the rib, and resonance between the natural frequency of the bellows and the rotational frequency of a rotor can be avoided. The seal member allows for adjustment of the natural frequency of the bellows even after fabrication of the bellows, whereby re-fabrication is made unnecessary.

According to the seal member of one embodiment of the present invention the bellows is formed in a corrugated shape, while the vibration control means is a ring-shaped rib provided in a circumferential direction in one or more grooves in outer circumference of the bellows. Accordingly, movement of the bellows can be restricted by retaining the groove(s)

with the rib, and the natural frequency of the bellows can be raised. Thereby, resonance between the natural frequency of the bellows and the rotational frequency of a rotor can be avoided. Also, the natural frequency of the bellows can be adjusted without using any special method during fabrication of the bellows but only by retrofitting a part to bellows that have already been fabricated.

According to the seal member of one embodiment of the present invention the rib is provided with a coating member on a surface on which the rib is in contact with the bellows, whereby wear of the bellows caused by fretting can be prevented.

According to the seal member of one embodiment of the present invention the vibration control means is at least one or more anti-vibration members disposed on an outer circumferential side of the bellows and along the same direction as an axial direction of the bellows. Accordingly, the natural frequency of the bellows can be raised by increasing the spring constant of the anti-vibration member(s), so that the natural frequency of the bellows can be adjusted. Thereby, resonance between the natural frequency of the bellows and the rotational frequency of a rotor can be avoided. Since the anti-vibration member is not in contact with the bellows, the bellows can maintain its strength.

If a corrugated bellows or compression coil spring is used as the anti-vibration member, the natural frequency of the bellows can be finely adjusted by attaching a weight in a central position in the axial direction of the corrugated bellows or compression coil spring. If anti-vibration rubber is used as the anti-vibration member, such anti-vibration rubber will provide damping, so that even if resonance occurs, the response can be reduced.

According to the seal member of one embodiment of the present invention at least two or more of the bellows are coupled in series, and the vibration control means includes a spacer interposed between the plurality of bellows. Accordingly, the natural frequency of the bellows can be adjusted by varying the mass of the spacer by changing its thickness. Thereby, resonance between the natural frequency of the bellows and the rotational frequency of a rotor can be avoided. Also, bellows that have already been fabricated can be used as they are, which means that the bellows can be fabricated with a similar method and therefore this can be carried out without much difficulty.

One embodiment of steam turbine of the present invention includes a low pressure turbine formed to include an inner casing disposed inside an outer casing, a turbine rotor disposed inside the inner casing, a plurality of rotor blades fixed to the turbine rotor at a predetermined interval, and a plurality of nozzles fixed inside the inner casing such as to be positioned between respective adjacent rotor blades, both ends of the turbine rotor being rotatably supported by a bearing part of the outer casing; and the seal member according to one of the embodiments above provided between the casing and the bearing in the steam turbine. Accordingly, accidents are prevented, and safety and reliability are enhanced.

According to one embodiment of the method of avoiding resonance of the present invention as set forth in an of the embodiment of the seal member discussed above is used to reinforce the rigidity of the bellows in a circumferential direction so as to adjust vibration frequency of the bellows. Accordingly, the rigidity of the bellows in the circumferential direction is reinforced and the vibration frequency of the bellows is adjusted, whereby resonance with the rotational frequency of a rotor can be avoided.

According to one embodiment of the method of avoiding resonance of the present invention, in an of the embodiment of the seal member discussed above is used for a bellows provided between a casing and a bearing in a steam turbine. Accordingly, the vibration frequency of the bellows is adjusted and resonance with the rotational frequency is avoided, whereby accidents are prevented, and safety and reliability are enhanced.

DETAILED DESCRIPTION OF THE INVENTION (Embodiment 1)

Figure 1:
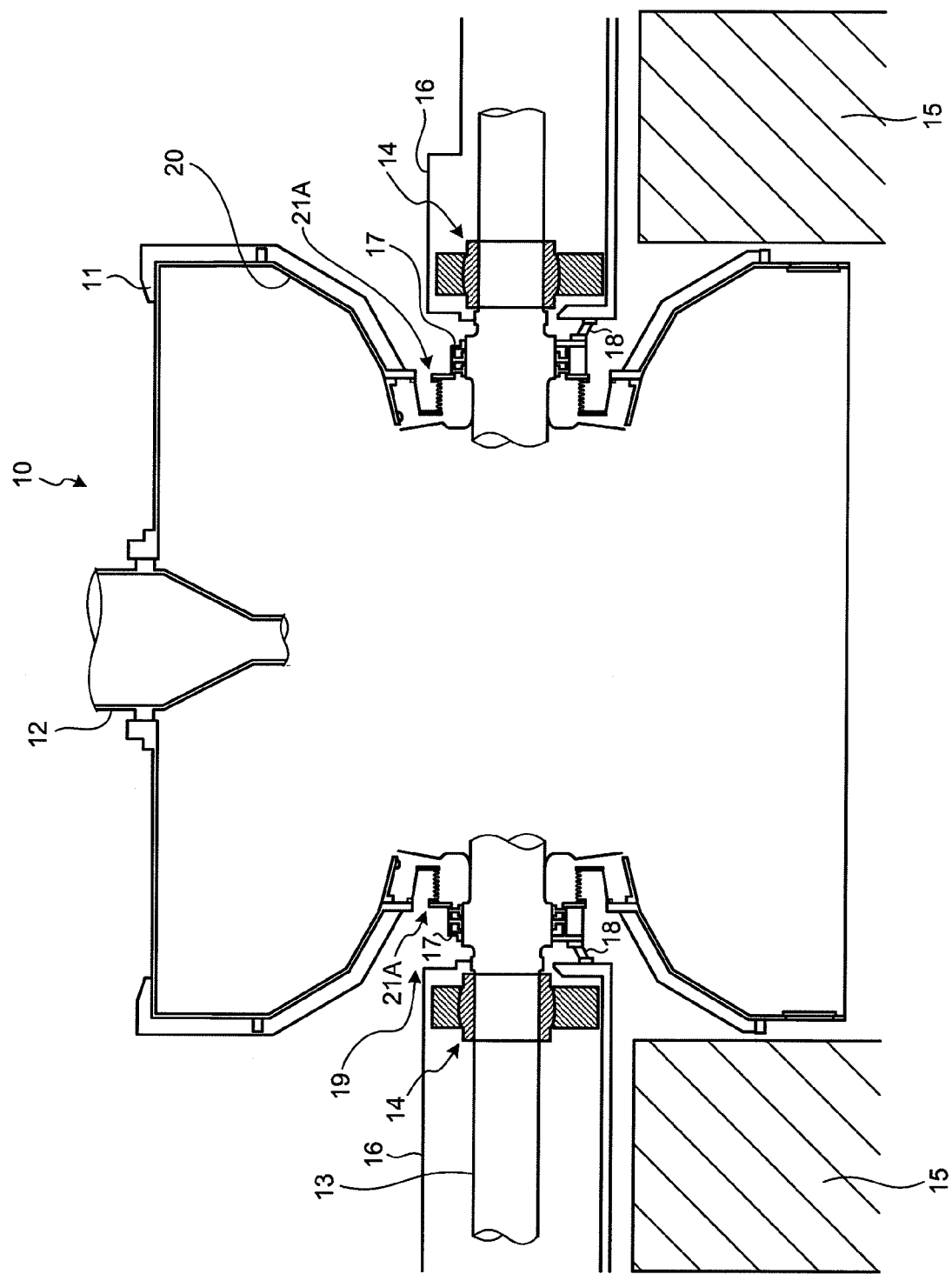
FIG. 1 is a schematic configuration diagram of a steam turbine, in which a seal member according to a first embodiment of the present invention is applied.
Figure 2:
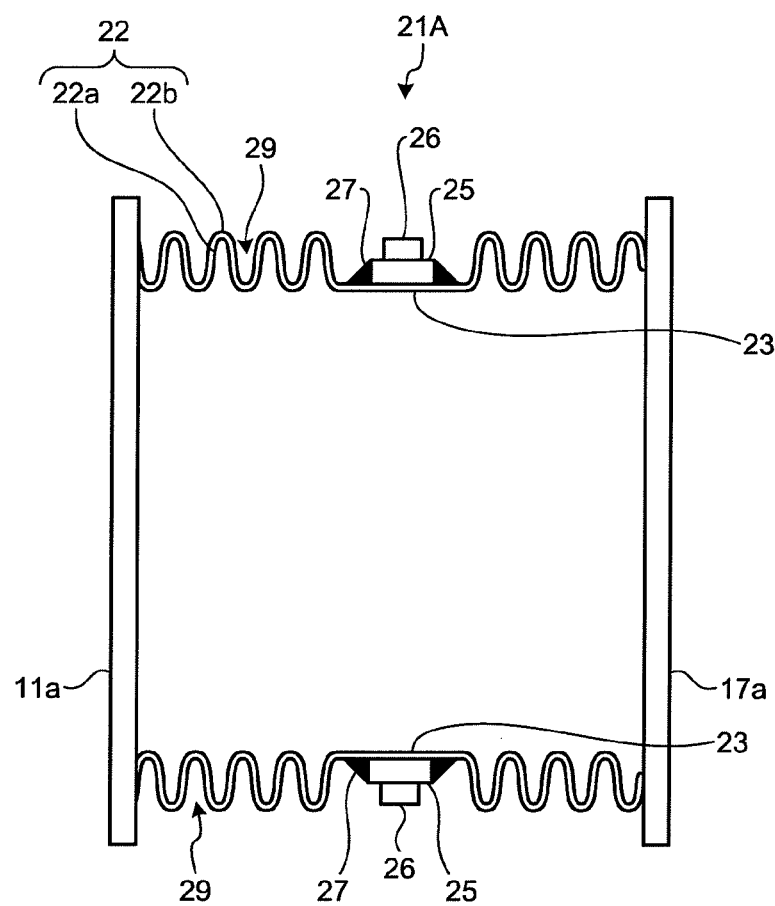
FIG. 2 is a conceptual diagram schematically showing the configuration of the seal member in the steam turbine of the first embodiment of the present invention.
Figure 3:
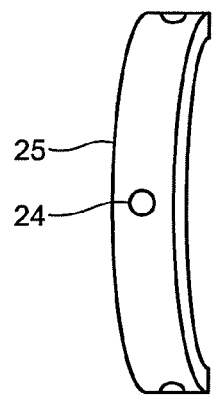
FIG. 3 is a conceptual diagram schematically showing the configuration of a ring-shaped rib of the seal member according to the first embodiment of the present invention.
Figure 4:
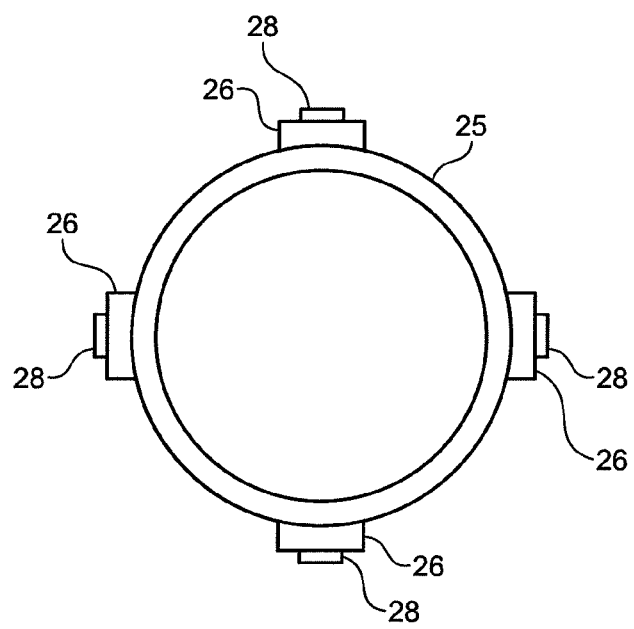
FIG. 4 is a cross-sectional view of the seal member according to the first embodiment of the present invention viewed from a direction orthogonal to an axial direction thereof.

FIG. 1 is a schematic configuration diagram of a steam turbine, to which a seal member according to a first embodiment of the present invention is applied. FIG. 2 is a conceptual diagram schematically showing the configuration of the seal member in the steam turbine of the first embodiment of the present invention. FIG. 3 is a conceptual diagram schematically showing the configuration of a ring-shaped rib of the seal member according to the first embodiment of the present invention. FIG. 4 is a cross-sectional view of the seal member according to the first embodiment of the present invention viewed from a direction orthogonal to the axial direction thereof.

The steam turbine 10, to which the seal member according to the first embodiment is applied, as shown in FIG. 1, is provided with a steam inlet portion 12 in an upper part of an outer casing 11. A turbine rotor 13 (hereinafter referred to as "rotor"), which is a rotating member, is supported by bearings 14 in a rotatable manner, and the bearings 14 are supported on a bearing base 16 disposed on a foundation 15 made of concrete or the like of the steam turbine 10. A gland part 17 is supported by the bearing base 16 and its connecting part 18. A first seal member 21A for preventing leakage of steam is employed between the gland part 17 and the outer casing 11.

In FIG. 1, reference numeral 19 denotes a through hole, and reference numeral 20 denotes an end plate corn portion.

The first seal member 21A according to the first embodiment of the present invention includes, as shown in FIG. 2 to FIG. 4, a double-structure bellows 22 in corrugated form and vibration control means provided on the outside of the bellows 22 such as to cover part of the bellows 22. A flat portion 23, which is not in the corrugated form, is provided in part of the bellows 22. The vibration control means is provided in a circumferential direction on the outer surface of the flat portion 23, and made up of a ring-shaped rib 25 having a plurality of holes 24 in the circumferential direction and weights 26 inserted in the holes 24 that are provided in the outer wall of the rib 25.

Referring to FIG. 2, an end plate 11a connects the bellows to the casing side, while an end plate 17a connects the bellows to the gland part side. Reference numeral 29 denotes grooves of the bellows.

The bellows 22 is formed by applying pressure from inside of two overlapping cylinders so that they are corrugated except for the flat portion 23 in a central portion in the axial direction. The rib 25 is welded to the flat portion 23 of the bellows 22, where weld parts 27 are formed.

While the bellows 22 in the present embodiment has a double-layer structure with two layers, an inner bellows 22a and an outer bellows 22b, the present invention is not limited to this embodiment.

Using the plurality of holes 24 provided in the circumferential direction of the rib 25, the weights 26 are fastened with bolts 28. By adjusting the number or mass of the weights 26 inserted in these holes 24, the natural frequency of the bellows 22 can be adjusted. Thereby, resonance between the natural frequency of the bellows 22 and the rotational frequency of the rotor 13 can be avoided.

To avoid resonance between the natural frequency of the bellows 22 and the rotational frequency of the rotor 13, the natural frequency of the bellows 22 may be changed either in the direction of increase or decrease. Even if the natural frequency of the bellows 22 is slightly higher than the rotational frequency of the rotor 13, when the natural frequency of the bellows 22 is made lower than the rotational frequency of the rotor 13 by increasing the number of weights 26, resonance between the natural frequency of the bellows 22 and the rotational frequency of the rotor 13 can be avoided.

The natural frequency of this first seal member 21A may be measured, and if there is a possibility of resonance with the rotational frequency of the rotor 13, the natural frequency of the first seal member 21A may be adjusted after fabrication thereof, so that the bellows 22 need not be fabricated again.

In the first seal member 21A according to the present embodiment, the grooves 29 on the outer face of the bellows 22 may be filled with a filler such as silicone, rubber, or adhesive. Filling the grooves near flanges of the end plate 11a of the outer casing 11 or the end plate 17a of the gland part 17 with the filler can increase rigidity of the bellows 22, whereby the natural frequency can be raised. Filling the grooves 29 in the central portion in the axial direction of the bellows 22 with the filler can increase the mass of the bellows 22, whereby the natural frequency of the bellows 22 can be decreased. This can be simply achieved, as there is no need to fabricate special parts for the bellows 22. This can also be done as a temporary measure.

Also, in the first seal member 21A according to the present embodiment, the space between the two bellows 22a and 22b may be filled with a high-viscosity material having a high viscosity such as oil or grease. Filling the space between these bellows 22a and 22b with the high-viscosity material can enhance the damping. That is, a filled bellows 22 filled with a high-viscosity material can have a response curve lower than a normal response curve of a filled bellows 22 that is not filled with a high-viscosity material between the bellows 22a and 22b. Therefore, by filling the space between the filled bellows 22 with the high-viscosity material, the response of the resonance, if any, between the natural frequency of the bellows 22 and the rotational frequency of the rotor 13 can be made minimum. Also, this can be applied simply to bellows 22 that have already been fabricated.

Thus, according to the first seal member 21A of the present embodiment, the flat portion 23 that is not in corrugated form is provided in part of the bellows 22 along the circumferential direction, and the vibration control means is provided in the circumferential direction on the outer surface of the flat portion 23. In this configuration, the ring-shaped rib 25 having the plurality of holes 24 in the circumferential direction and the weights 26 inserted in the holes 24 provided in the outer wall of this rib 25 are used as the vibration control means, so that the natural frequency of the bellows 22 can be adjusted with the number of the weights 26 attached to the rib 25. Thereby, resonance between the natural frequency of the bellows 22 and the rotational frequency of the rotor 13 can be avoided. Also, the natural frequency of the bellows 22 is adjustable even after the fabrication of the bellows 22, so that re-fabrication is made unnecessary.

(Embodiment 2)

A second seal member according to a second embodiment of the present invention will be described with reference to the drawings.

Figure 5:
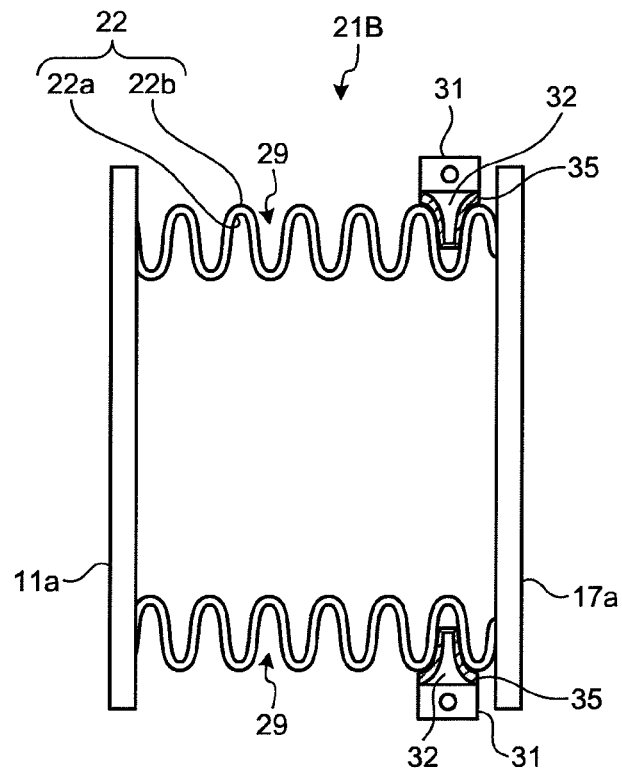
FIG. 5 is a conceptual diagram schematically showing the configuration of a second seal member according to a second embodiment of the present invention.
Figure 6:
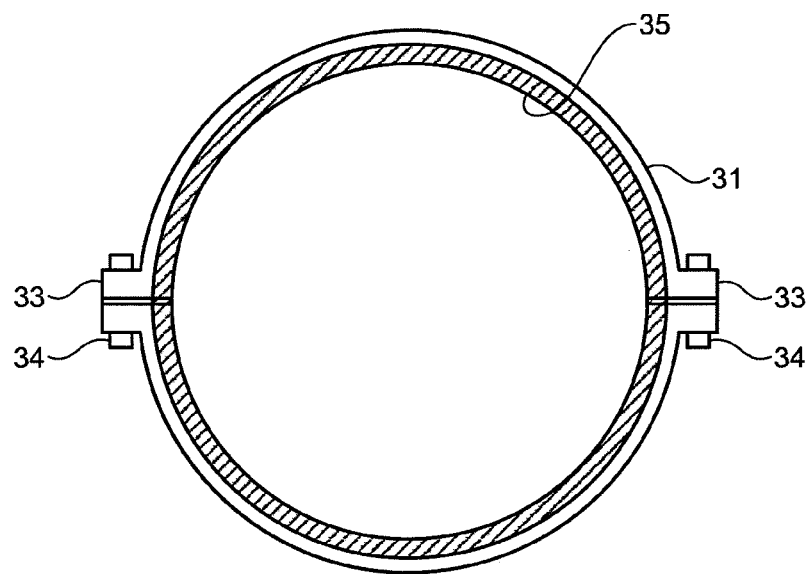
FIG. 6 is a cross-sectional view of the seal member according to the second embodiment of the present invention viewed from a direction orthogonal to the axial direction thereof.

FIG. 5 is a conceptual diagram schematically showing the configuration of the second seal member according to the second embodiment of the present invention, and FIG. 6 is a cross-sectional view of the seal member according to the second embodiment of the present invention viewed from a direction orthogonal to the axial direction thereof.

The same elements as those of the first embodiment are given the same reference numerals and a description thereof will be omitted. A description of the entire steam turbine will be omitted and the configuration of the seal member only will be described.

As shown in FIG. 5 and FIG. 6, the second seal member 21B according to the present embodiment includes, as the vibration control means, a ring-shaped rib 31 provided in the circumferential direction of at least a part of grooves 29 of the corrugation on the outer circumference of the bellows 22, and having a convex-shaped tip end portion 32 fitted into the groove 29.

This rib 31 is fastened with bolts 34 at two bolt-fastened portions 33. While the rib is fastened with bolts 34 at two locations in the present embodiment, the present invention is not limited to this embodiment.

Thus, by providing the ring-shaped rib 31 in the circumferential direction in at least a part of grooves 29 on the outer circumference of the bellows 22 such that the convex-shaped tip end portion 32 is fitted into the groove 29, the groove 29 is retained by the rib 31 to restrict the movement of the bellows 22, whereby the natural frequency of the bellows 22 is increased. Thereby, the natural frequency of the bellows 22 can be adjusted without using any special method during fabrication of the bellows 22 but only by retrofitting the rib to bellows 22 that have already been fabricated, and resonance between the natural frequency of the bellows 22 and the rotational frequency of the rotor 13 can be avoided.

In the second seal member 21B according to the present embodiment, a coating member 35 is provided on a surface of the rib 31 on which the rib is in contact with the bellows 22, i.e., between the inner wall side of the rib 31 and the outer wall side of the bellows 22. The coating member 35 is not limited to a particular material and can be any soft member such as resin or plastic or any soft material such as rubber. The provision of the coating member 35 between the inner wall side of the rib 31 and the outer wall side of the bellows 22 can prevent wear of the bellows 22 caused by fretting.

(Embodiment 3)

A third seal member according to a third embodiment of the present invention will be described with reference to the drawings.

Figure 7:
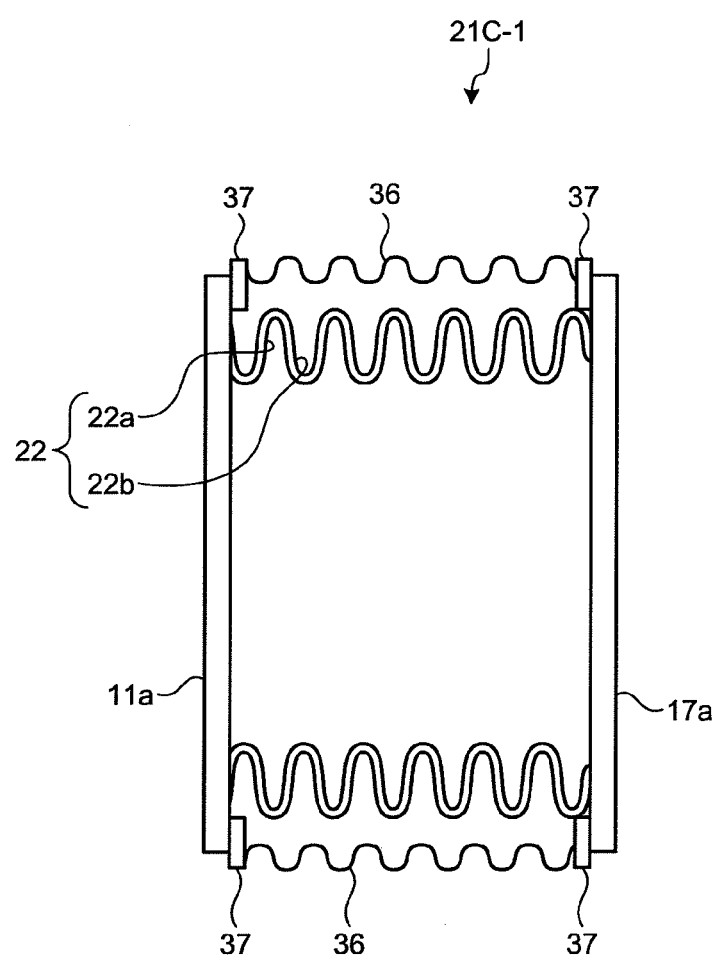
FIG. 7 is a conceptual diagram schematically showing the configuration of a third seal member according to a third embodiment of the present invention.

FIG. 7 is a conceptual diagram schematically showing the configuration of the third seal member according to the third embodiment of the present invention.

The same elements as those of the first embodiment are given the same reference numerals and a description thereof will be omitted. A description of the entire steam turbine will be omitted and the configuration of the seal member only will be described.

As shown in FIG. 7, the third seal member 21C-1 according to the present embodiment includes, as an anti-vibration member of the vibration control means, a bellows 36 in corrugated form that may be of various kinds and is different from the bellows 22, the bellows 36 being disposed on the outer circumferential side of the bellows 22 and along the same direction as the axial direction of the bellows 22.

This bellows 36 is coupled by support members 37 respectively provided on the bellows 22 side of the end plate 11a of the outer casing 11 and end plate 17a of the gland part 17.

The bellows 36 may have either the same compression force as the bellows 22 or a different one and the compression force may be adjusted at any suitable time in accordance with the natural frequency of the bellows 22.

Thus, by providing the bellows 36 on the outer circumferential side of the bellows 22 and along the same direction as the axial direction of the bellows 22, the spring constant of the bellows 22 is increased to raise the natural frequency of the bellows 22, whereby the natural frequency of the bellows 22 can be adjusted. Since the bellows 36 is not in contact with the bellows 22, the bellows 22 can maintain its strength, and with weights attached to a central position in the axial direction of the bellows 22, the natural frequency of the bellows 22 can be finely adjusted.

Figure 8:
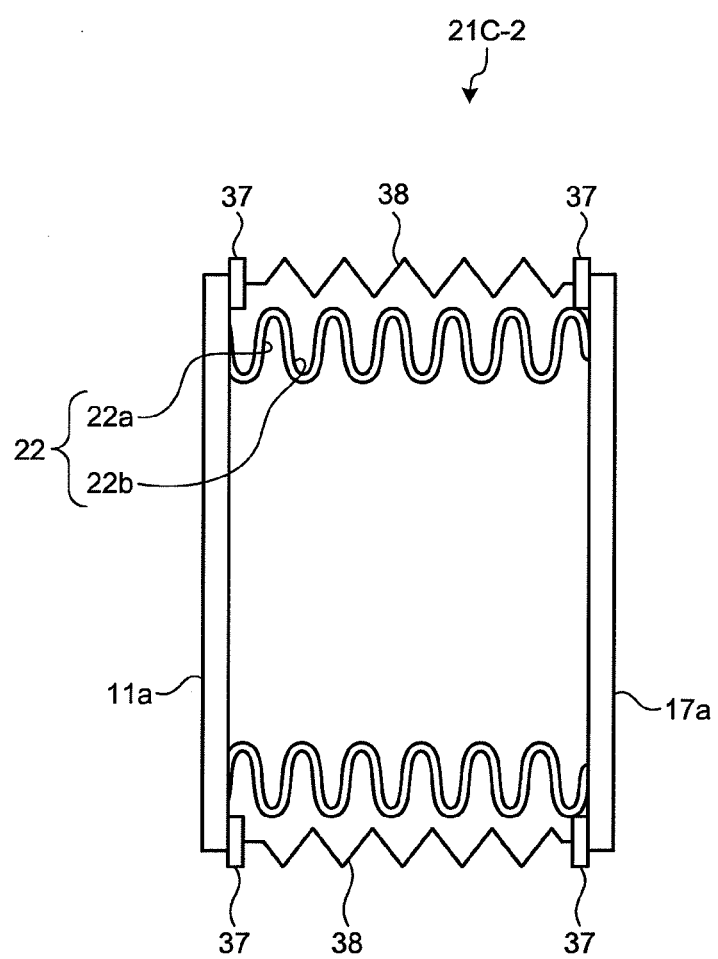
FIG. 8 is a conceptual diagram schematically showing another configuration of the third seal member according to the third embodiment of the present invention.
Figure 9:
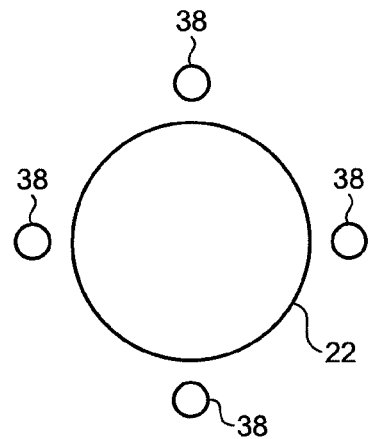
FIG. 9 is a cross-sectional view of the third seal member according to the third embodiment of the present invention viewed from a direction orthogonal to the axial direction thereof.

Another configuration of the third seal member according to the third embodiment of the present invention is shown in FIG. 8 and FIG. 9. FIG. 8 is a conceptual diagram schematically showing another configuration of the third seal member according to the third embodiment of the present invention. FIG. 9 is a cross-sectional view of the third seal member according to the third embodiment of the present invention viewed from a direction orthogonal to the axial direction thereof.

As shown in FIG. 8, the third seal member 21C-2 may include a compression coil spring 38 disposed on the outer circumferential side of the bellows 22 and along the same direction as the axial direction of the bellows 22. By providing the compression coil spring 38 on the outer circumferential side of the bellows 22 and along the same direction as the axial direction of the bellows 22, similarly to the third seal member 21C-1, the spring constant of the bellows 22 is increased to raise the natural frequency, whereby the natural frequency of the bellows 22 can be adjusted. Thereby, resonance between the natural frequency of the bellows 22 and the rotational frequency of the rotor 13 can be avoided. Also, since the compression coil spring 38 is not in contact with the bellows 22, the bellows 22 can maintain its strength. Further, with weights attached to a central position in the axial direction of the compression coil spring 38, the natural frequency of the bellows 22 can be finely adjusted.

As shown in FIG. 9, the third seal member 21C-2 has the compression coil springs 38 attached at four locations around the outer circumference of the bellows 22. However, the present invention is not limited to this embodiment, and the number of the compression coil springs 38 may be adjusted in accordance with the natural frequency of the bellows 22. For example, providing more compression coil springs 38 can increase the natural frequency of the bellows 22, and therefore, in order to increase the natural frequency of the bellows 22, a larger number of compression coil springs 38 are provided. On the other hand, in order to decrease the natural frequency of the bellows 22, the number of compression coil springs 38 given is reduced.

For the third seal member 21C-1 of the present embodiment, the member provided around the outer circumference of the bellows 22 is not limited to those above and can be any member as long as it is provided around the outer circumference of the bellows 22 such as not to touch the bellows 22 and allow the bellows to maintain its strength.

(Embodiment 4)

A fourth seal member according to a fourth embodiment of the present invention will be described with reference to the drawings.

Figure 10:
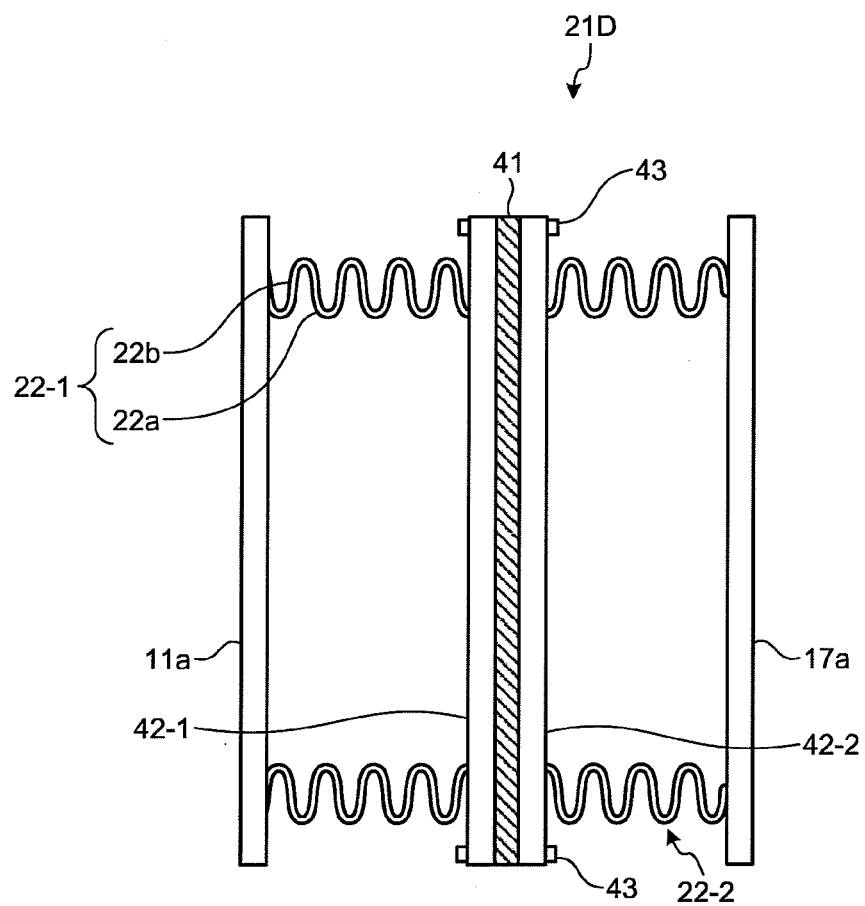
FIG. 10 is a conceptual diagram schematically showing the configuration of a fourth seal member according to a fourth embodiment of the present invention.

FIG. 10 is a conceptual diagram schematically showing the configuration of the fourth seal member according to the fourth embodiment of the present invention.

The same elements as those of the first embodiment are given the same reference numerals and a description thereof will be omitted. A description of the entire steam turbine will be omitted and the configuration of the seal member only will be described.

As shown in FIG. 10, the fourth seal member 21D according to the present embodiment includes, as vibration control means, a member that increases the mass between the two bellows 22.

That is, the fourth seal member 21D according to the present embodiment includes, as shown in FIG. 10, two bellows 22-1 and 22-2 coupled in series, with a spacer 41 provided between the bellows 22-1 and 22-2. As the material for the spacer 41, for example, stainless steel and the like is used. The spacer 41 here functions as a weight.

These bellows 22-1 and 22-2 and the spacer 41 are fastened together at their respective end plates 42-1 and 42-2 and on the outer circumference of the spacer 41 using bolts 43 and the like. The method of retaining the bellows 22-1 and 22-2 and the spacer 41 is not limited to this.

The thickness of this spacer 41 is varied in accordance with the natural frequency required for the bellows 22-1 and 22-2 as a whole. Changing the thickness of the spacer 41 changes its mass, whereby the overall natural frequency of the bellows 22-1 and 22-2 can be adjusted.

Alternatively, instead of varying the thickness of the spacer 41, its material may be changed so as to change the mass of the spacer 41 similarly, thereby adjusting the overall natural frequency of the bellows 22-1 and 22-2.

Thus, with two bellows 22-1 and 22-2 coupled in series and with the spacer 41 provided between the bellows 22-1 and 22-2, the natural frequency of the bellows 22-1 and 22-2 can be adjusted because the mass of the spacer 41 can be varied by changing the thickness of the spacer 41. Thereby, resonance between the natural frequency of the bellows 22-1 and 22-2 and the rotational frequency of the rotor 13 can be avoided.

Also, bellows 22-1 and 22-2 that have already been fabricated can be used as they are, which means that the bellows can be fabricated with a similar method and therefore the present embodiment can be carried out without much difficulty.

While the fourth seal member 21D according to the present embodiment includes one spacer 41 between the two bellows 22-1 and 22-2 coupled in series, the present invention is not limited to this embodiment, and three or more bellows 22 may be coupled in series and spacers 41 may be provided one each between respective adjacent bellows 22.

(Embodiment 5)

A fifth seal member according to a fifth embodiment of the present invention will be described with reference to the drawings.

Figure 11:
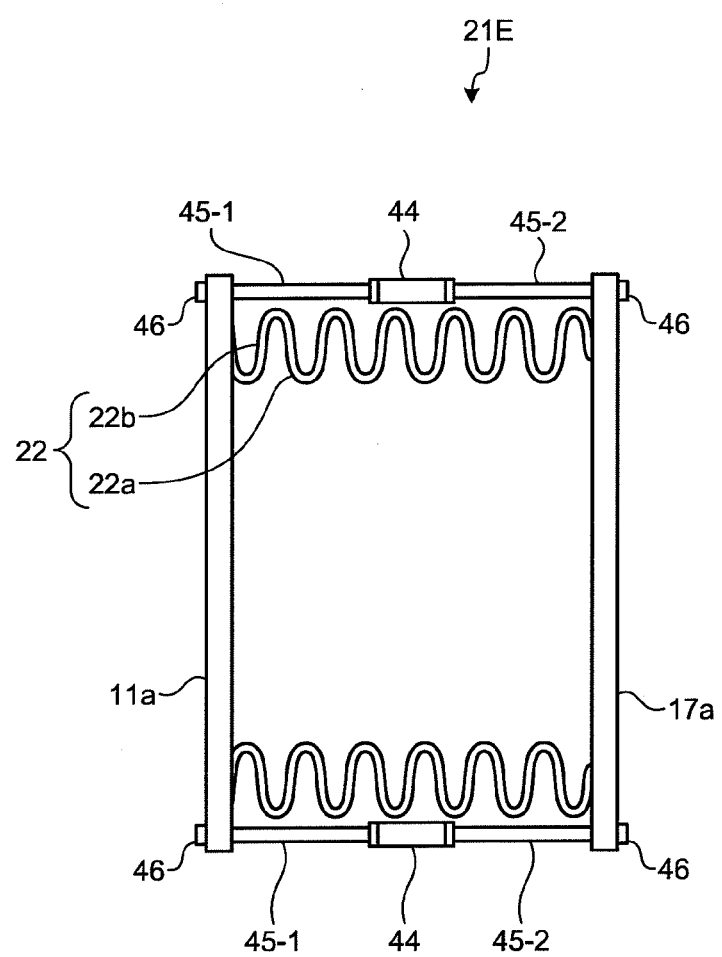
FIG. 11 is a conceptual diagram schematically showing the configuration of a fifth seal member according to a fifth embodiment of the present invention.

FIG. 11 is a conceptual diagram schematically showing the configuration of the fifth seal member according to the fifth embodiment of the present invention.

The same elements as those of the first embodiment are given the same reference numerals and a description thereof will be omitted. A description of the entire steam turbine will be omitted and the configuration of the seal member only will be described.

As shown in FIG. 11, the fifth seal member 21E according to the present embodiment includes, as an anti-vibration member of the vibration control means, an anti-vibration rubber 44 on the outer circumferential side of the bellows 22 and along the same direction as the axial direction of the bellows 22, both ends of the anti-vibration rubber 44 being supported around the outer circumference of the bellows 22 with support bars 45-1 and 45-2.

That is, the fifth seal member 21E according to the present embodiment includes, as shown in FIG. 11, an anti-vibration rubber 44 on the outer circumferential side of the bellows 22 and along the same direction as the axial direction of the bellows 22, and support bars 45-1 and 45-2 provided at both ends of the anti-vibration rubber 44 for supporting the anti-vibration rubber 44 around the outer circumference of the bellows 22. The anti-vibration rubber 44 can be of any material that can secure flexibility. As the material for the anti-vibration rubber 44, for example, fluorine rubber or any such material having corrosion resistance is used.

The support bar 45-1 may be retained to the end plate 11a of the outer casing 11 with, for example, a bolt 46 or the like, and similarly, the support bar 45-2 may be retained to the end plate 17a of the gland part 17 with, for example, a bolt 46 or the like.

The support bars 45-1 and 45-2 are provided on both sides of the anti-vibration rubber 44 to be used for supporting the anti-vibration rubber 44 around the outer circumference of the bellows 22, and in addition, the rigidity of the support bars 45-1 and 45-1 is varied by changing their cross-sectional areas.

Thus, the anti-vibration rubber 44 is provided on the outer circumferential side of the bellows 22 along the same direction as the axial direction of the bellows 22, with the support bars 45-1 and 45-2 on both sides of this anti-vibration rubber 44 for supporting the same around the outer circumference of the bellows 22. Accordingly, the anti-vibration rubber 44 is pressed from both sides by the support bars 45-1 and 45-2, and flexibility is secured by the anti-vibration rubber 44. At the same time, rigidity is varied by changing the cross-sectional areas of the support bars 45-1 and 45-2, whereby the natural frequency of the bellows 22 can be adjusted. Thereby, resonance between the natural frequency of the bellows 22 and the rotational frequency of the rotor 13 can be avoided. Also, as the anti-vibration rubber 44 provides damping, even if resonance occurs, the response can be reduced.

While the fifth seal member 21E according to the present embodiment includes two anti-vibration rubbers 44 around the outer circumference of the bellows 22, the present invention is not limited to this embodiment. For example, like the compression coil springs 38 of the third seal member 21C-2 shown in FIG. 9, three or more anti-vibration rubbers 44 may be provided circumferentially around the outer circumference of the bellows 22.

While the anti-vibration rubber 44 is pressed between two support bars 45-1 and 45-2 in the fifth seal member 21E according to the present embodiment, the present invention is not limited to this embodiment. Instead, two or more anti-vibration rubbers 44 may be provided in the axial direction around the outer circumference of the bellows 22, with support bars 45 respectively provided on both sides of each anti-vibration rubber 44 to support the anti-vibration rubbers 45 in series.

The seal member according to the present invention adjusts the natural frequency of the bellows so that resonance between the natural frequency of the bellows and the rotational frequency of a rotor of a shaft is avoided, and is applicable to steam turbines having any kind of bellows employed therein.

The invention claimed is:

1. A seal member, comprising:
a multiple-layer bellows including at least two or more overlapping bellows spaced apart a predetermined distance from each other; and
a vibration control unit on an outside of the bellows such as to cover part or all of the bellows, wherein
the bellows is formed in a corrugated shape, and
the vibration control unit is a ring-shaped rib disposed in a circumferential direction in one or more grooves in outer circumference of the bellows.

2. The seal member according to claim 1, wherein the rib is has a coating member on a surface on which the rib is in contact with the bellows.

3. A steam turbine, comprising:
a low pressure turbine including an inner casing disposed inside an outer casing, a turbine rotor disposed inside the inner casing, both ends of the turbine rotor being rotatably supported by a bearing part of the outer casing; and
the seal member according to claim 1, provided between the casing and the bearing in the steam turbine.

4. A method of avoiding resonance, comprising using the seal member according to claim 1, to reinforce rigidity of the bellows in a circumferential direction, thereby adjusting vibration frequency of the bellows.

5. A method of avoiding resonance, comprising using the seal member according to claim 1 for a bellows between a casing and a bearing in a steam turbine.

* * * * *